United States Patent [19]
Okawa et al.

[11] Patent Number: 6,126,365
[45] Date of Patent: Oct. 3, 2000

[54] BORING TOOL

[75] Inventors: Masayuki Okawa; Hidehiko Nagaya; Kazuya Yamazaki, all of Ibaraki-ken; Yoichi Ishikawa, Ohmiya, all of Japan

[73] Assignee: Mitsubishi Materials Corporation, Tokyo, Japan

[21] Appl. No.: 09/285,404

[22] Filed: Apr. 2, 1999

[30] Foreign Application Priority Data

Apr. 2, 1998 [JP] Japan .................................. 10-090468

[51] Int. Cl.[7] ............................. B23B 29/02; B23B 27/16
[52] U.S. Cl. ........................... 407/66; 407/100; 407/103; 407/115
[58] Field of Search ................................ 407/66, 97, 100, 407/102, 103, 114, 115, 6, 33, 42, 47, 53; 408/713

[56] References Cited

U.S. PATENT DOCUMENTS

| | | | |
|---|---|---|---|
| 2,127,998 | 8/1938 | Jearum .................................. | 407/115 X |
| 3,354,526 | 11/1967 | Erkfritz ................................. | 407/103 X |
| 3,656,859 | 4/1972 | Rietzler et al. ...................... | 407/114 X |
| 4,693,641 | 9/1987 | Tsujimura et al. ................... | 407/53 X |
| 5,156,503 | 10/1992 | Tsujimura et al. ................... | 407/713 X |
| 5,848,862 | 12/1998 | Antoun ................................. | 407/103 X |

FOREIGN PATENT DOCUMENTS 3803188  8/1988  Germany .................................. 407/66

*Primary Examiner*—Henry W. H. Tsai
*Attorney, Agent, or Firm*—Oblon, Spivak, McClelland, Maier & Neustadt, P.C.

[57] ABSTRACT

A boring tool includes a concave groove formed on the outer peripheral surface of a tool body on the side opposite from a cutting blade with respect to an axis of the tool body. The concave, groove 10 is formed so as to extend from a position x, which is separated rearwardly from a front end face of a head portion, toward the rear side, and to be open downward from above a rake face. Furthermore, a sub-groove is formed between the concave groove and a chip pocket. Accordingly, the natural frequency is increased by reducing the weight of the head portion while limiting rigidity reduction, thereby restricting chattering.

3 Claims, 4 Drawing Sheets

BORING TOOL

BACKGROUND OF THE INVENTION

1. Field of the Invention

The present invention relates to a boring tool for use in internal machining or the like for a prepared hole formed in a workpiece.

2. Description of the Related Art

As a tool for machining the inner periphery of a prepared hole of a rotating workpiece, for example, a boring tool is known in which a tip made of a cemented carbide alloy is detachably screwed to a front end portion of an approximately cylindrical tool body.

This boring tool is inserted in a prepared hole of a workpiece, which is supported by a main shaft of a machine tool and rotates at high speed, so as to cut the inner peripheral surface of the prepared hole with a cutting blade formed in the tip.

Since machining with the boring tool is performed in a state in which the tool body shaped like a shaft is extendedly projected, chattering is prone to arise.

For this reason, chattering has been hitherto prevented by making the tool body thick as long as it does not interfere with discharging of chips, by making the entire tool body of a high-speed steel, or by other means, in order to increase the rigidity of the tool body.

As disclosed in Japanese Unexamined Utility Model No. 4-2505, a boring tool that restricts chattering by making a tool body thicker toward the end is known to include a second chip pocket open on the outer peripheral surface of the tool body opposite from the side where a first chip pocket is open, in order to enhance chip discharging efficiency. In these cases, however, it is impossible to prevent the amplitude of chattering from increasing due to the resonance that arises when the frequency of external force (cutting resistance) applied from the workpiece to the tool and the natural frequency of a machine system including the tool coincide with each other. This is a problem in a case in which the inner peripheral surface of a deep prepared hole must be precisely finished, a case in which high dimensional accuracy is necessary, and in other cases.

SUMMARY OF THE INVENTION

The present invention has been made in view of the above circumstances, and an object of the present invention is to prevent chattering by reducing the weight of a boring tool without reducing rigidity so as to increase the natural frequency of the boring tool itself.

According to the present invention, a boring tool includes a concave groove formed on the outer peripheral surface of a tool body on the side opposite from a cutting blade with respect to the axis of the tool body so as to be open downward from above a rake face, as viewed from the direction of the axis.

In this boring tool, since the weight of an end portion of the tool body is reduced and the natural frequency of the tool-itself is increased by forming the concave groove in the end portion, it is possible to increase the difference between the natural frequency of a machine system including the tool and the frequency of external force, and to thereby restrict chattering. Moreover, by forming the concave groove in such a position, a satisfactory thickness is secured along the direction in which the principal force of the cutting force acts, and a part is left to function as a rib for the thrust force of the cutting force. Therefore, rigidity can be maintained.

Preferably, the boring tool further includes a sub-groove formed between a chip pocket and the concave groove.

In this boring tool, the sub-groove is added between the concave groove and the chip pocket in addition to the concave groove formed in the aforementioned position, which makes it possible to further reduce the weight of the end portion of the tool body, and to thereby further restrict chattering.

Preferably, the concave groove does not have an opening at the front end of the tool body.

Since the concave groove is formed so as not to be open at the front end of the tool body in this boring tool, it is possible to further restrict rigidity from decreasing due to the formation of the concave groove, compared with a case in which the concave groove is open at the front end of the tool body.

DETAILED DESCRIPTION OF THE PREFERRED EMBODIMENTS

A boring tool according to an embodiment of the present invention will be described below with reference to FIGS. 1 to 6.

Figure 1:
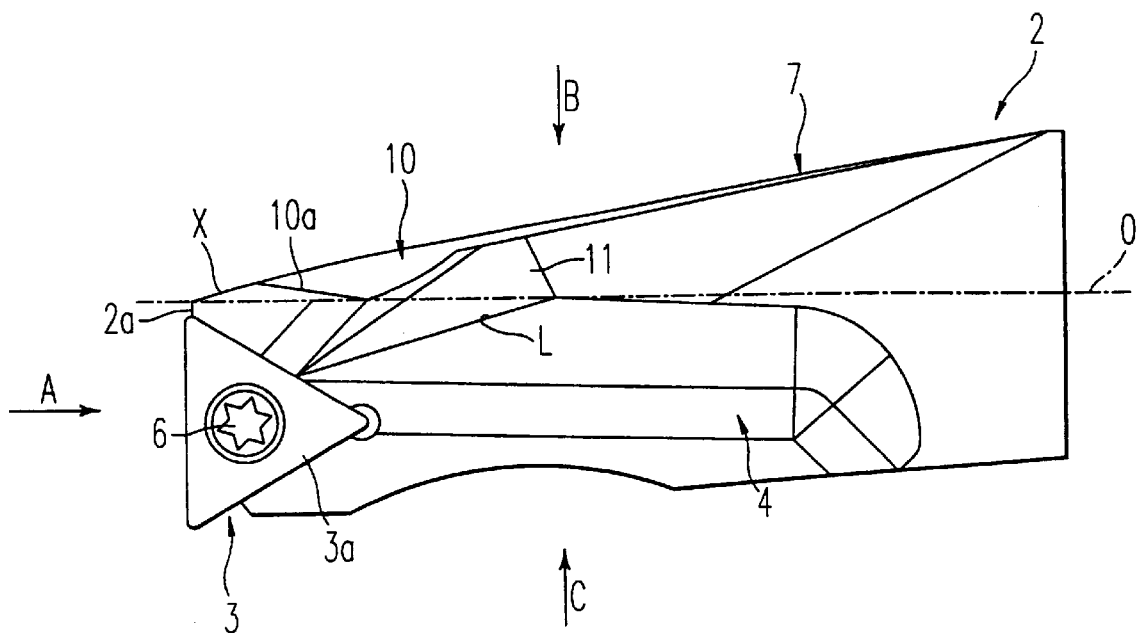
FIG. 1 is a plan view of a head portion of a boring tool according to an embodiment of the present invention, as viewed from the side of a rake face of a tip.

FIG. 1 is a plan view of a forward end portion (hereinafter referred to as a "head portion") of a boring tool of this embodiment, as viewed from the side of a rake face of a tip. In these figures, numerals 1, 2, 3, and 4 denote a tool body, a head portion, a tip, and a chip pocket, respectively, and the letter O denotes the axis of the tool body 1.

The tool body 1 has an approximately cylindrical outline, and the chip pocket 4 is formed in the head portion 2 that represents the end portion of the tool body 1.

The chip pocket 4 is indented inward in the radial direction around approximately one third of the circumference of the head portion 2 that is circular in cross section, and extends from a front end face 2a of the head-portion 2 toward the rear end. A rear end portion of the chip pocket 4 forms an inclined face that gently links to the outer peripheral surface of the tool body 1.

Figure 4:
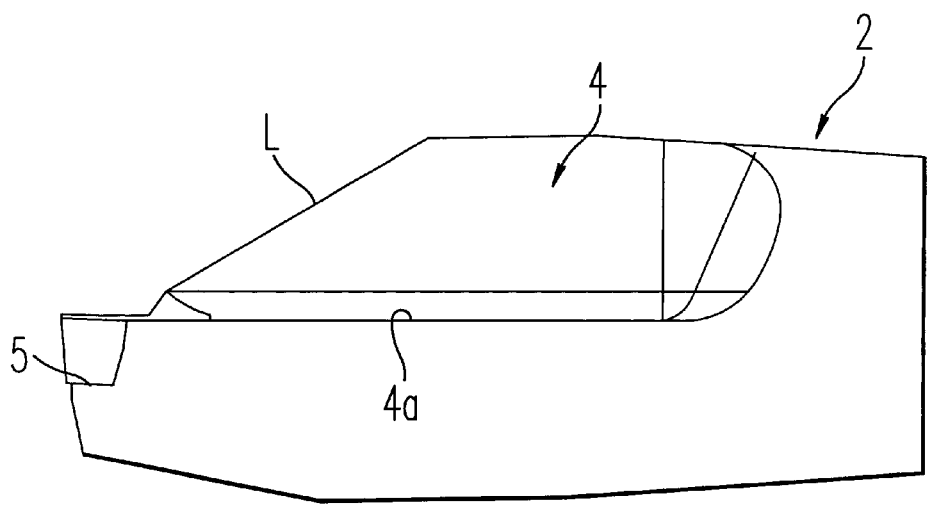
FIG. 4 is a view seen from the direction of the arrow C of FIG. 1.

At the front end of a face 4a of the chip pocket 4 that points back in the workpiece rotating direction, a tip mount 5 is formed to be indented a step lower than the face 4a, as shown in FIG. 4. On the tip mount 5, the tip 3 having a cutting blade made of a cemented carbide alloy or the like is seated, and is detachably mounted thereon by a clamp screw 6 in a state in which a rake face 3a of the tip 3 and face 4a chip pocket 4 are substantially coplanar.

In addition to the chip pocket 4, the head portion 2 is provided with a cutout portion 7 that is formed by cutting out the outer peripheral surface of the head portion 2 opposite from the cutting blade with respect to the axis O of the tool body 1.

This cutout portion 7 is formed to be gradually indent inwardly in the radial direction from the rear end of the outer peripheral surface of the head portion 2 toward the front end, as shown in FIG. 1.

Furthermore, the cutout portion 7 is provided with a concave groove 10 for the purpose of reducing the weight of the head portion 2. The concave groove 10 is formed to extend by a predetermined length from a position x, which is separated rearwardly from the front end face 2a of the head portion 2, toward the rear side. That is, a front end 10a of the concave groove 10 is not open on the front end face 2a of the head portion 2, as distinguished from the chip pocket 4 that is open on the front end face 2a of the head portion 2.

Figure 2:
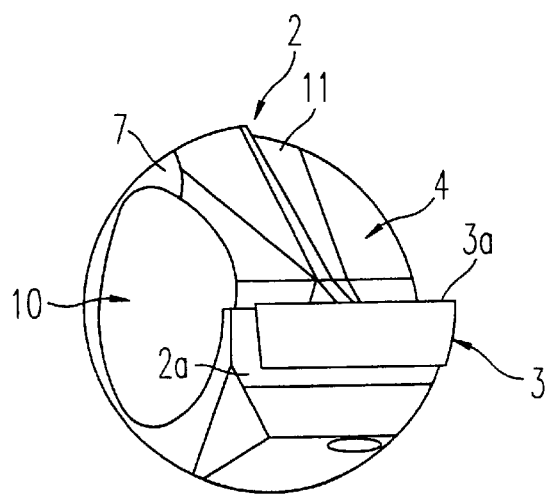
FIG. 2 is a view seen from the direction of the arrow A of FIG. 1.

The concave groove 10 is open downward from above the rake face 3a, as seen from the axial direction of the tool body 1, that is, when the tool body 1 is seen from the front side toward the rear side along the axis O, as shown in FIG. 2.

Figure 5A:
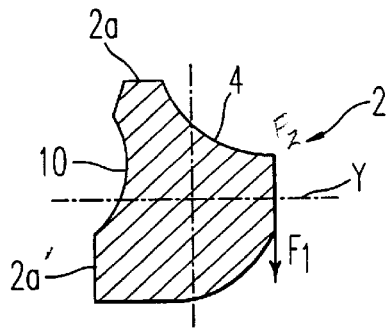
FIG. 5(a) is a cross-sectional view taken along line 5a.–5a. of FIG. 3.
Figure 5B:
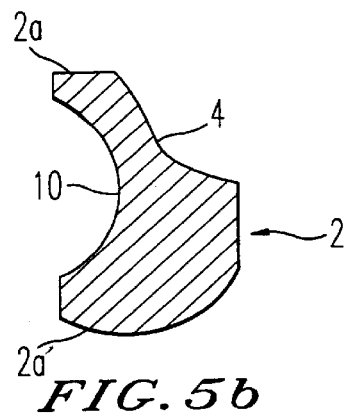
FIG. 5(b) is a cross-sectional view taken along line 5b.–5b. of FIG. 3.
Figure 5C:
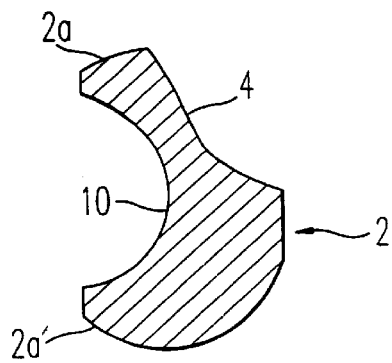
FIG. 5(c) is a cross-sectional view taken along line 5c.–5c. of FIG. 3.
Figure 5D:
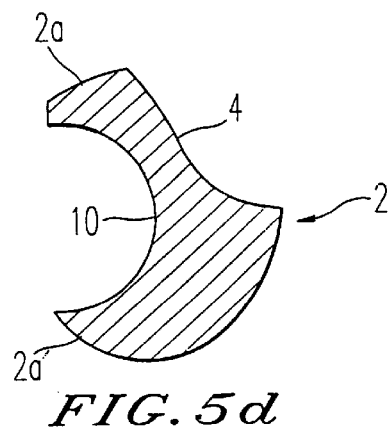
FIG. 5(d) is a cross-sectional view taken along line 5d.–5d. of FIG. 3.

In the head portion 2 having the concave groove 10 structured as described above, a satisfactory thickness is secured in the direction in which a principal force F1 of the cutting force acts, and a rib portion 2a, for supporting a thrust force F2 is also secured, as shown in FIG. 5a.

A sub-groove 11 is formed between the chip pocket 4 and the concave groove 10 in the head portion 2. The sub-groove 11 is provided to further reduce the weight of the head portion 2, and links to the front end of the chip pocket 4 via a cross ridge L. Furthermore, the sub-groove 11 is indented from the outer peripheral surface of the head portion 2 in approximately the shape of a fan in plan view (see FIG. 1), in which the rake face 3a of the tip 3 is seen from directly above, so that sub-groove 11 gradually widens from the front side to the rear side of the head portion 2.

Figure 6:
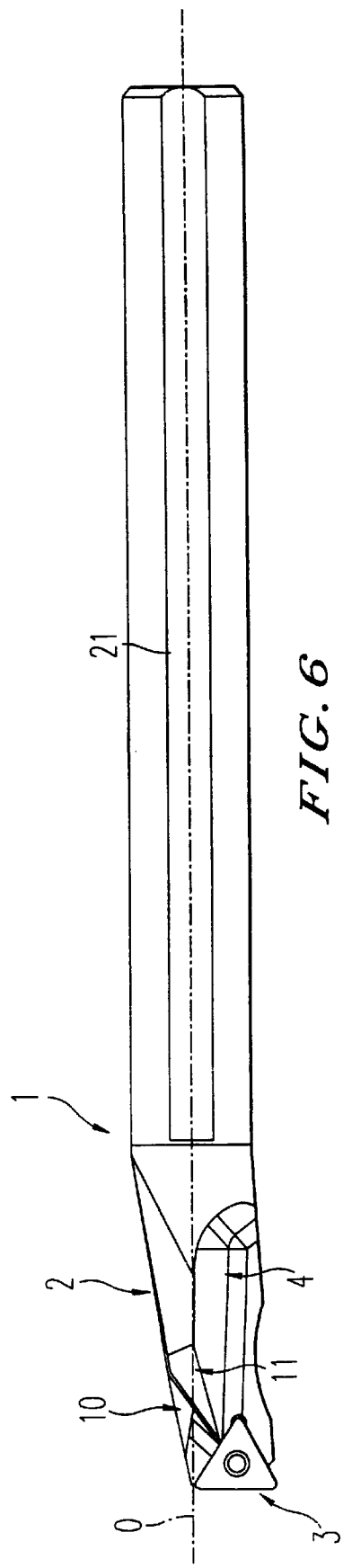
FIG. 6 is a plan view showing the overall configuration of the boring tool shown in FIG. 1.

On the other hand, the tool body 1 is provided, on its base-end side, with two parallel flat faces 21 (one of which is not shown) that are formed by planing the outer periphery of the tool body 1, as shown in FIG. 6. These flat faces 21 are provided to prevent the tool body 1, supported on a tool post of a machine tool, from rotating so that the tool body 1 is not rotated by cutting resistance applied from a workpiece that rotates at high speed on the axis O together with the main shaft of the machine tool.

Figure 3:
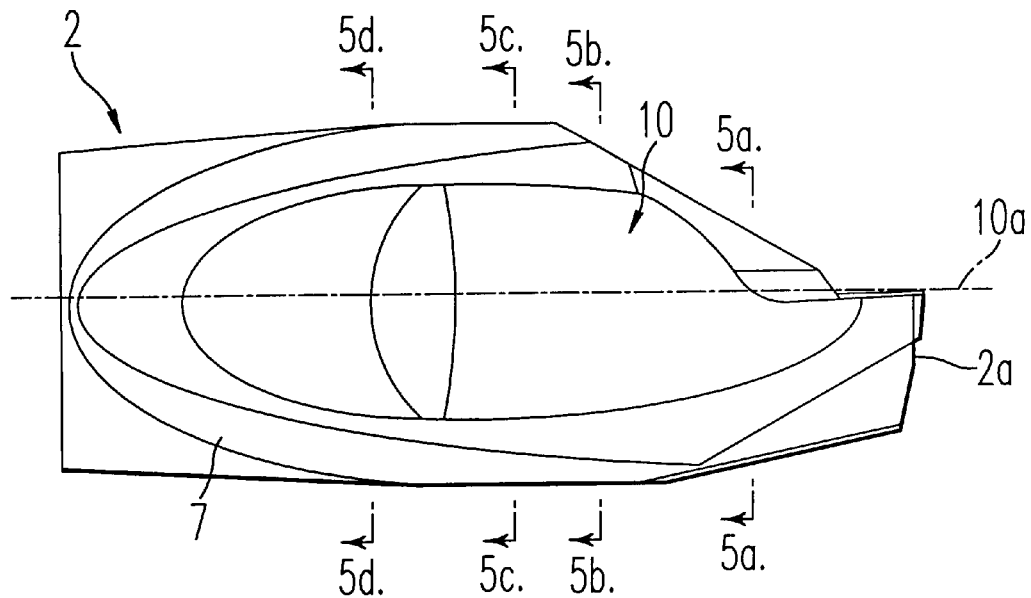
FIG. 3 is a view seen from the direction of the arrow B of FIG. 1.

As described above, in the boring tool of this embodiment, the weight of the head portion 2 is reduced by forming the cutout portion 7 so as to substantially surround the periphery of the concave groove, as shown in FIGS. 2 and 3, and the concave groove 10 in the head portion 2, separate from the chip pocket 4, thereby increasing the natural frequency. Furthermore, the weight of the head portion 2 is further reduced by forming the sub-groove 11 in addition to the cutout portion 7 and the concave groove 10, thereby further increasing the natural frequency. This makes it possible to increase the difference between the natural frequency of the machine system including the boring tool and the frequency of external force, and to thereby restrict chattering due to resonance. As shown in FIG. 3, the length of groove 10 is such as to be substantially the equivalent of the length of head portion 2.

By forming the cutout portion 7 and the concave groove 10 in such positions, a satisfactory thickness is secured along the direction in which the principal force F1 of the cutting force acts, as shown in FIGS. 5a to 5d, thereby limiting rigidity reduction.

In other words, chattering is restricted with rigidity reduction limited by removing extra thickness while maintaining the second moment of area with respect to the axis Y perpendicular to the principal force F1.

Since the rib portion 2a is also secured to support the thrust force F2, rigidity is increased with respect to the stress that acts in the direction along the thrust force F2, so that chattering is not apt to arise in this direction.

Furthermore, since the front end of the concave groove 10 is not open on the front end face 2a of the head portion 2, reduction in rigidity is further limited.

From the above, according to the boring tool of this embodiment, since chattering is restricted by preventing resonance during machining while maintaining tool rigidity as before, it is possible to enhance working accuracy and to prevent fracture at the tip. In addition, it is possible to increase the amount of projection of the tool body, and to thereby precisely finish the inner peripheral surface of a prepared hole having a large depth.

While the sub-groove 11 is formed between the chip pocket 4 and the concave groove 10 in the description of this embodiment, this is not always necessary. That is, even when the boring tool has only the concave groove 10 having the above structure in the head portion 2, it can reduce chattering compared with the conventional boring tool while-maintaining tool rigidity.

As is apparent from the above description, the present invention can offer the following advantages:

(a) In the boring tool according to the present invention, chattering can be restricted by forming the concave groove in the head portion so as to reduce the weight of the head portion and to thereby increase the natural frequency of the tool itself. Moreover, since rigidity is prevented from being reduced due to the formation of the concave groove by forming the concave groove in the outer peripheral surface on the side opposite from the cutting blade with respect to the axis of the tool body, it is possible to enhance working accuracy and to prevent fracture at the tip, and furthermore, it is possible to increase the amount of projection of the tool body, and to thereby precisely finish the inner peripheral surface of a prepared hole having a large depth.

(b) The weight of the head portion is further reduced by forming the concave groove in the above-described position, and forming the sub-groove as well between the concave groove and the chip pocket, thereby increasing the natural frequency of the tool itself. Therefore, it is possible to further restrict chattering.

(c) When the concave groove is formed so as not to be open at the front end of the head portion in order to further restrain rigidity from being reduced due to the formation of the concave groove, compared with a case in which the concave groove is open at the front end of the head portion, it is possible to further restrict chattering.

What is claimed as new and desired to be secured by Letters Patent of the United States is:

1. A boring tool comprising:

a tool body having a head portion and a cutting blade tip at a forward end of said head portion;

a chip pocket formed in proximity with a face portion of said tip; and a concave groove which is formed on an outer peripheral surface of said head portion on a side opposite said cutting blade tip with respect to a longitudinal axis of said tool body and said concave groove being located adjacent to a face portion of said head portion substantially opposite said face portion of said tip, as viewed along the longitudinal axis of the tool body; and said head portion including a cutout portion which substantially surrounds a peripheral portion of said concave groove to reduce the weight of the head portion, said concave groove extending along substantially an entire length of said head portion.

2. A boring tool according to claim 1, wherein a sub-groove is formed between said chip pocket and said concave groove.

3. A boring tool according to claim 1, wherein said concave groove does not have an opening at the front end of said tool body.

* * * * *